US011658994B2

(12) United States Patent
Johnston et al.

(10) Patent No.: US 11,658,994 B2
(45) Date of Patent: May 23, 2023

(54) TECHNIQUES FOR EFFICIENT NETWORK SECURITY FOR A WEB SERVER USING ANOMALY DETECTION

(71) Applicant: KOUNT INC., Boise, ID (US)

(72) Inventors: Joshua Michael Johnston, Boise, ID (US); Matthew Lewis Jones, Boise, ID (US); Nathan Daniel Monnig, Boise, ID (US); Divyanshu Rohit Murli, Boise, ID (US)

(73) Assignee: KOUNT INC., Boise, ID (US)

( * ) Notice: Subject to any disclaimer, the term of this patent is extended or adjusted under 35 U.S.C. 154(b) by 0 days.

(21) Appl. No.: 17/754,854

(22) PCT Filed: Jul. 14, 2021

(86) PCT No.: PCT/US2021/041640
§ 371 (c)(1),
(2) Date: Apr. 14, 2022

(87) PCT Pub. No.: WO2022/031412
PCT Pub. Date: Feb. 10, 2022

(65) Prior Publication Data

US 2022/0377096 A1 Nov. 24, 2022

Related U.S. Application Data

(60) Provisional application No. 63/063,126, filed on Aug. 7, 2020.

(51) Int. Cl.
*H04L 9/40* (2022.01)
*G06F 21/55* (2013.01)

(52) U.S. Cl.
CPC ...... *H04L 63/1425* (2013.01); *H04L 63/1433* (2013.01); *H04L 63/1458* (2013.01)

(58) Field of Classification Search
CPC ............. H04L 63/1425; H04L 63/1433; H04L 63/1458; H04L 63/1416; H04L 63/20;
(Continued)

(56) References Cited

U.S. PATENT DOCUMENTS 9,628,499 B1 4/2017 Yu et al.
2017/0126745 A1* 5/2017 Taylor ................. H04L 63/0227
(Continued)

FOREIGN PATENT DOCUMENTS

CN 107196930 A 9/2017
EP 2947849 A1 11/2015

OTHER PUBLICATIONS

Yang et al., "Optimized Configuration of Exponential Smoothing and Extreme Learning Machine for Traffic Flow Forecasting," Year: 2019 | vol. 15, Issue: 1 | Journal Article | Publisher: IEEE Cited by: Papers (45).*

(Continued)

*Primary Examiner* — Roderick Tolentino
(74) *Attorney, Agent, or Firm* — Kilpatrick Townsend & Stockton LLP

(57) ABSTRACT

A method described herein involves various operations directed toward network security. The operations include accessing transaction data describing network traffic associated with a web server during an interval. Based on a count of new transactions involving an online entity during the interval according to the transaction data, a short-term trend is determined for the online entity. The operations further include applying exponential smoothing to a history of transactions of the online entity to compute a long-term trend for the online entity. Based on a comparison between the short-term trend and the long-term trend for the online entity, an anomaly is detected with respect to the online entity in the network traffic associated with the web server.

(Continued)

Responsive to detecting the anomaly, an access control is implemented between the online entity and the web server.

17 Claims, 4 Drawing Sheets

(58) Field of Classification Search
CPC . H04L 63/1441; H04L 63/1408; H04L 41/16; H04L 67/535
See application file for complete search history.

(56) References Cited

U.S. PATENT DOCUMENTS

| | | | | |
|---|---|---|---|---|
| 2019/0238581 A1* | 8/2019 | Song | ................... | G06F 16/2474 |
| 2019/0311367 A1* | 10/2019 | Reddy | ................ | G06Q 20/4016 |
| 2020/0097579 A1* | 3/2020 | Manjappa | ........... | G06F 16/2358 |
| 2020/0120131 A1* | 4/2020 | Soni | ........................ | H04L 47/12 |
| 2020/0265351 A1* | 8/2020 | Rohit | .................. | G06F 16/2457 |
| 2020/0334680 A1* | 10/2020 | Vanga | ..................... | G06Q 40/04 |
| 2021/0049606 A1* | 2/2021 | Garcia | ............... | G06Q 30/0633 |
| 2021/0067548 A1* | 3/2021 | Brandt | ................... | G06N 7/005 |
| 2021/0243595 A1* | 8/2021 | Buck | ..................... | H04W 12/02 |

OTHER PUBLICATIONS

Formichella et al., "A recursive clock anomalies detector with double exponential smoothing," 2018 European Frequency and Time Forum (EFTF) Year: 2018 | Conference Paper | Publisher: IEEE.*
"Exponential Smoothing", Available Online at: URL:https://en.wikipedia.org/w/index.php?title=Exponential_smoothing, Nov. 14, 2016, 8 pages.
International Application No. PCT/US2021/041640, "International Search Report and Written Opinion", dated Oct. 6, 2021, 11 pages.

* cited by examiner

TECHNIQUES FOR EFFICIENT NETWORK SECURITY FOR A WEB SERVER USING ANOMALY DETECTION

CROSS-REFERENCE TO RELATED APPLICATIONS

This application is a 371 U.S. National Stage of PCT Application No. PCT/US2021/041640, filed Jul. 14, 2021, which claims the benefit of and priority to U.S. Provisional Application No. 63/063,126 filed Aug. 7, 2020, which is hereby incorporated by reference in its entirety.

TECHNICAL FIELD

This disclosure relates generally to network security and, more specifically, to efficient network security for a web server using anomaly detection.

BACKGROUND

Network security is a key issue for a web server operating over a data network. Generally, network security involves data policies and practices to protect a data network, such as a web server operating as part of a data network, from malicious activity that could harm network operations or entities associated with the data network. Network security can involve detecting malicious use of the data network, and often, malicious use is characterized by anomalies in network traffic over the data network.

Detecting anomalies in network traffic for the purpose of network security is a difficult task in part because network traffic is a form of time-series data. Time-series data is a set of data points indexed by time, such that each time is associated with a corresponding value. As the time resolution of time-series data increases, trends in the time-series data become more susceptible to noise. As a result, it becomes harder to determine if short bursts in the data are anomalous. Specifically, in the case of network traffic, it becomes difficult to determine whether short bursts in network traffic are anomalous and thus potentially represent fraudulent use of the data network.

SUMMARY

Various aspects of the present disclosure provide techniques for providing network security by detecting anomalous network traffic and applying access controls responsive to such anomalous network traffic.

Some examples are executed by a network security system operating in conjunction with a web server to provide network security related to the web server. For instance, various transactions occur between client devices and the web server, and the network security system accesses transaction data describing such transactions. From the transaction data, the network security system determines a short-term trend for an online entity, which may be associated with one or more client devices, based on a count of new transactions involving the online entity during an interval. The network security system applies exponential smoothing to a history of transactions of the online entity to compute a long-term trend for the online entity. Based on a comparison between the short-term trend and the long-term trend for the online entity, the network security system detects that an anomaly exists with respect to the online entity in the network traffic associated with the web server. Responsive to detecting the anomaly, the network security system implements an access control between the online entity and the web server. Further, in some examples, the network security system or other system of this disclosure includes a processor as well as a non-transitory computer-readable medium having instructions that are executable by the processor to cause the processor to perform these or other operations.

An example of a method of this disclosure includes accessing transaction data describing network traffic associated with a web server during an interval. The method further includes determining a short-term trend for an online entity, based on a count of new transactions involving the online entity during the interval according to the transaction data. The method further includes applying exponential smoothing to a history of transactions of the online entity to compute a long-term trend for the online entity. The method further includes detecting that an anomaly exists with respect to the online entity in the network traffic associated with the web server, based on a comparison between the short-term trend and the long-term trend for the online entity. Additionally, the method includes implementing an access control between the online entity and the web server responsive to detecting the anomaly.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
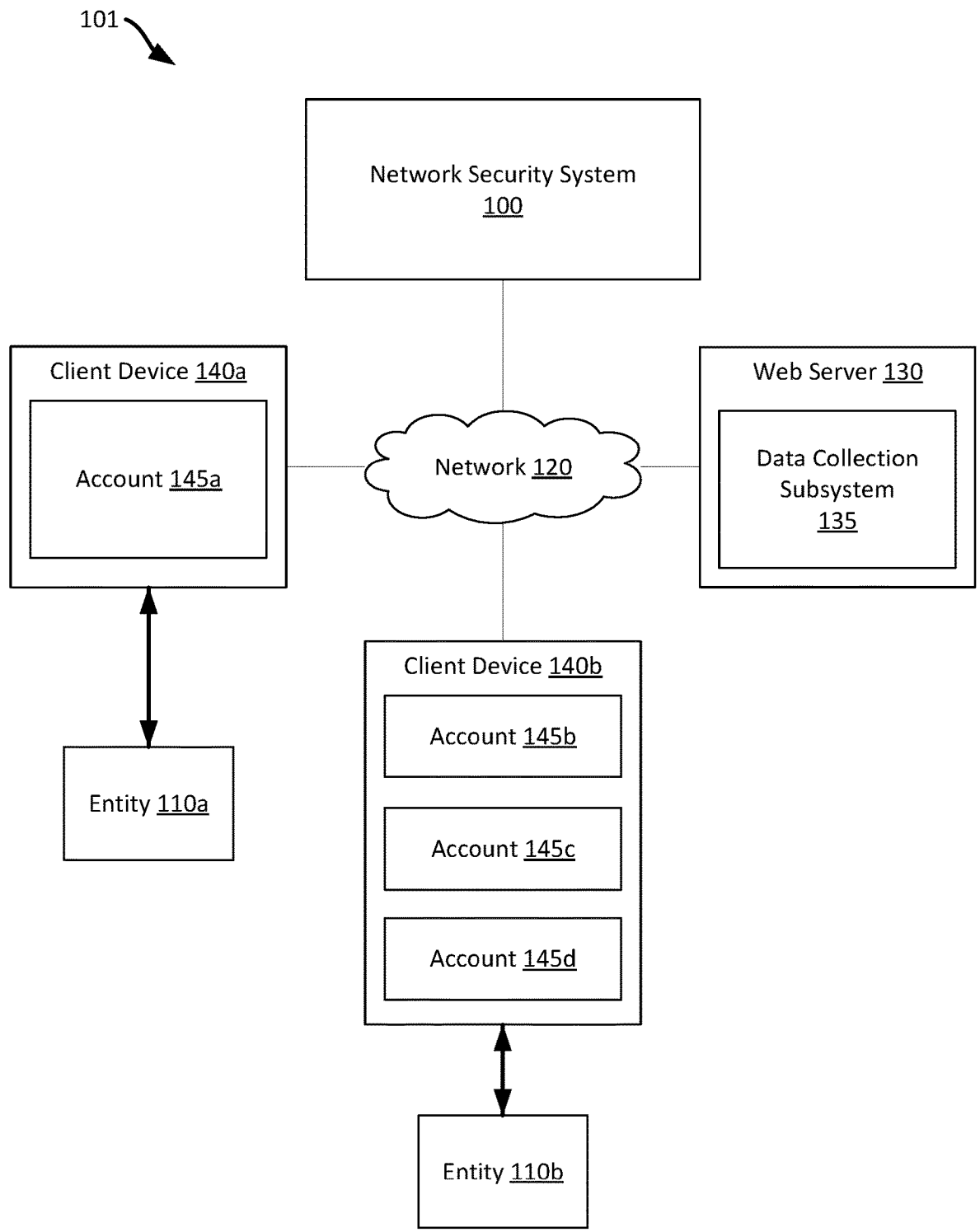
FIG. 1 is a diagram of a computing environment of a web server and associated network security system for efficiently detecting and handling anomalies in network traffic associated with the web server, according to some examples of this disclosure.

In the field of network security, real-time detection of anomalies in network traffic is difficult due to the burst nature of network traffic. Because of the variation, or noise, that appears in regular traffic to and from web servers, bursts that are actually anomalies representing malicious traffic can be difficult to spot. Existing systems that attempt to identify anomalies with respect to network traffic have significant drawbacks. For instance, some existing systems fail to account for the bursty nature of network traffic and, as a result, flag an unreasonable number of false positives. As a result, a web server associated with such anomaly detection consumes an unnecessary amount of computing resources to remediate traffic flagged as potentially anomalous when such traffic represents nothing more than bursts in activity. Some examples of the present disclosure can address this drawback of existing systems and therefore provide an improvement in the technical field of network security and in the technical field of web server operations.

Certain aspects and features of the present disclosure relate to more precisely detecting anomalies in network traffic associated with a web server, or in other time-series data, by using exponential smoothing or by using a comparison of short and long trends. Some examples can involve determining one or more trends in time-series data over one or more periods. The trends can include a fast trend, or a short-term trend, representing interactions during a short time period such as five minutes, and a slow trend, or a long-term trend, representing interactions during a longer period such as twenty-four hours or a week. Some examples in this disclosure exponentially smooth values of time-series data across an applicable period to exponentially reduce an effect of older data on the trends. Some examples determine a score by comparing trends, such as the fast trend and the slow trend, to each other or to other suitable values. The score indicates whether one or more anomalies are present in a time period. Because the score is determined using exponential smoothing or may incorporate information from both a fast trend and a slow trend, the score can be indicative of anomalies even in the existence of noisy data. Examples described herein use this score to alert about or remediate anomalies that can represent malicious traffic.

Examples described herein provide improvements in the technical field of web server operations. Existing systems are lacking because they do not sufficiently account for the noise expected in network traffic associated with web servers. However, some examples can reduce false positives through the use of exponential smoothing, through the comparison of multiple trends over varying-length periods, or through a combination of these techniques. As a result, with the reduction of false positives, implementation of techniques described herein can cause a reduced amount of interruption involved in remediation tasks performed by or on behalf of a web server when a potential anomaly is identified.

Overview of the Network Security System

Referring now to the drawings, FIG. 1 is a diagram of a computing environment 101 of a web server 130 and associated network security system 100 for efficiently detecting and handling anomalies in network traffic associated with the web server 130, according to some examples of this disclosure. In some examples, the network security system 100 detects anomalies in network traffic associated with the web server 130, where anomalies can be indicative of malfunctions or malicious activity. Although examples described herein relate to improving operation of the web server 130, some examples are additionally or alternatively configured to improve efficiency when detecting and handling potential anomalies outside the realm of web server operations.

As shown in FIG. 1, in some examples, the computing environment 101 includes the network security system 100. An example of the computing environment 101 also includes a web server 130 and one or more client devices 140, through which one or more entities 110 can access the web server 130. Although one web server 130 and two client devices 140 are illustrated in FIG. 1 for clarity, other examples can include multiple web servers 130 or one or more client devices 140 in various quantities. Additionally or alternatively, all or a portion of the network security system 100 is integrated with the web server 130 in some examples. Various implementations are within the scope of this disclosure.

As shown in FIG. 1, an example of the network security system 100 communicates with a web server 130, such as over a network 120. The network can be a local network or the internet, for example. In some examples, one or more client devices 140, such as a first client device 140a and a second client device 140b, interact with the web server 130 over a network 120. For instance, the interactions are initiated by one or more entities 110, such as a first entity 110a and a second entity 110b. An entity 110 can be, for example, a human user or automated user, or an entity can be a client device 140, account 145, IP address, or email address used to access the web server 130. An example of the network security system 100 receives from the web server 130 information about such interactions. Given this information, the network security system 100 detects anomalies in the interactions between the client devices 140 and the web server 130 and may perform remediation upon such detection.

The client devices 140 can include one or more computing devices capable of receiving input, such as user input, as well as transmitting or receiving data via the network 120. In some examples, a client device 140 can be a conventional computer system such as a desktop or a laptop computer or can be a smartphone, a tablet, or another type of computing device. In some examples, a client device 140 is configured to communicate with the web server 130 via the network 120. For instance, the client device 140 executes an application, such as an installed application or a web application, allowing a user or other entity 110 associated with the client device 140 to interact with the web server 130. In another example, the client device 140 interacts with the web server 130 through an application programming interface (API), which could run on a native operating system of the client device 140.

The network 120 can be one or more of various types of data networks. An example of the network is one or a combination of local area networks or wide area networks using wired communication systems, wireless communication systems, or a combination thereof. In some examples, the network 120 can use standard communications technologies or protocols. For example, the network 120 can include communication links using technologies such as Ethernet, 802.11, worldwide interoperability for microwave access (WiMAX), 3G, 4G, code division multiple access (CDMA), digital subscriber line (DSL), or other technologies. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 can be represented using one or various suitable formats, such as hypertext markup language (HTML) or extensible markup language (XML). In some examples, all or a subset of the communication links of the network 120 are encrypted using one or more suitable techniques.

In some examples, one or more accounts 145 are associated with a client device 140. In the example shown in FIG. 1, the first client device 140a is associated with a first account 145a, and the second client device 140b is associated with a second account 145b, a third account 145c, and a fourth account 145d. In some examples, an account 145 is linked to a corresponding web server 130 and is used to access that web server 130. For example, an account 145 is associated with user credentials for accessing the web server 130 one behalf of a particular entity 110. In other examples, an account may be associated with offline services. For instance, an account 145 may be a credit card account provided by an issuing institution. As shown with respect to the first client device 140*a*, various accounts 145 may be used in conjunction with a single client device 140. Additionally or alternatively, an account 145 may be accessed and thus associated with more than a single client device 140, such as may be the case if an entity 110 utilizes multiple client devices 140.

The web server 130 can provide various services accessible by the client devices 140. In some examples, the web server 130 can provide consumable media content, financial services, informational services, or other online services over the network 120 to the client devices 140. Specifically, in some examples, the web server 130 is a content server configured to provide search results, text, images, or video content; the web server 130 is configured to fulfill online purchases; or the web server 130 is configured to authenticate user credentials responsive to information received from client devices 140.

In some examples, the web server 130 includes a data collection subsystem 135 that collects interaction data describing interactions between the web server 130 and client devices 140. For instance, interaction data describing an interaction can include a unique interaction identifier and contextual information associated with the interaction, such as an identifier (e.g., an Internet Protocol (IP) address or a media access control (MVAC) address) for the applicable client device 140, information about the client device's hardware or software, or information identifying an active or authenticated account 145 used to access the web server 130 or a third-party system for performing the interaction. An example of the web server 130 can transmit the interaction data to the network security system 100 for analysis and processing, or additionally or alternatively, the network security system 100 monitors the web server 130, such as the data collection subsystem 135 in particular, to determine the interaction data.

In some examples, the data collection subsystem 135 disguises all or a portion of the interaction data, such as through hashing or encryption, to protect sensitive data prior to transmitting the interaction data to the network security system 100. In some examples, if the interaction data is encrypted, the network security system 100 has access to an applicable decryption key or encryption function to allow the network security system 100 to decrypt the interaction data. Additionally or alternatively, an example of the data collection subsystem 135 provides to the network security system 100 hashed versions of all or a portion of the interaction data to anonymize the information provided to the network security system 100. For instance, if the data collection subsystem 135 determines that an interaction involved an entity 110 associated with an email address, an example of the data collection subsystem 135 hashes the email address using a predefined and cryptographically secure hashing algorithm and provides the hashed email address to the network security system 100. Additionally or alternatively to an email address, the data collection system 135 can hash an entity name, an identifier for the applicable client device 140, and account identifier, or other identifying information. Accordingly, by using the hashed information rather than the original identifying information, the network security system 100 can track information about interactions without accessing identifying information.

In some examples, if one or more web servers 130 use hashing to anonymize the interaction data, the network security system 100 tracks information across the one or more web servers without compromising sensitive data or privacy of the entity 110 or entities 110 accessing the web servers 130. In some examples, the data collection subsystem 135 may include a description of the interaction data that corresponds to hash values to aid in analysis. For example, the description of variable, entity-defined data such as passwords or user names may indicate a quantity of characters hashed (e.g., four, six, or eight) and an extraction paradigm (e.g., first four, last six, middle eight, or all). If the interaction data corresponds to the last four digits of a credit card number, the interaction data may include a description that indicates that the interaction corresponds to the last four digits of the credit card number. In one example relating to user names and passwords, the data collection subsystem 135 may produce a variety of hash values from a single password or user name based on the application of multiple extraction paradigms to facilitate comparisons with hash values from other web servers 130 that can include varying password and user name requirements. Various implementations are possible and are within the scope of this disclosure.

Figure 2:
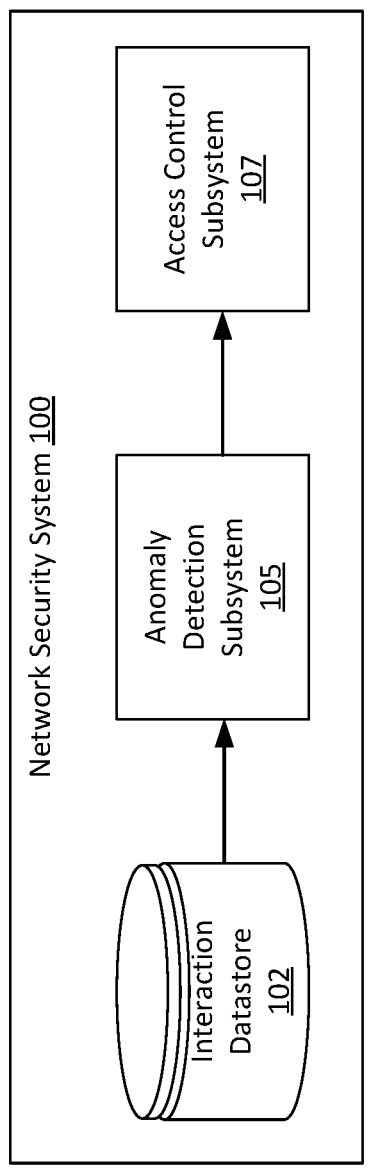
FIG. 2 is a diagram of the network security system, according to some examples of this disclosure.

FIG. 2 is a diagram of a network security system 100, according to some examples of this disclosure. In some examples, as shown in FIG. 2, the network security system 100 includes an interaction datastore 102, an anomaly detection subsystem 105, and an access control subsystem 107. Generally, the interaction datastore 102 receives and stored interaction data from the web server 130; the anomaly detection subsystem 105 processes the interaction data to detect anomalies; and the access control subsystem 107 performs remediation, such as by implementing an access control, responsive to detected anomalies. The subsystems of the network security system 100, such as the interaction datastore 102, the anomaly detection subsystem 105, and the access control subsystem 107 may be implemented as hardware, software, or a combination of both. Although these subsystems are described as being distinct, such distinction is for illustrative purposes only, and these subsystems can share hardware or software or can be further divided.

In some examples, the interaction datastore 102 maintains interaction data received from one or more web servers 130. The interaction datastore 102 can be one or more files, database tables, databases, or other storage objects. The interaction datastore 102 may additionally store information that the anomaly detection subsystem 105 determines about the interactions involving the one or more web servers 130. For example, the interaction datastore 102 may store a determined likelihood that the interaction is fraudulent. Additionally, the network security system 100 can modify the stored information about an interaction based on additionally received information from a web server 130 or a third-party system. For example, the interaction datastore 102 can store information about an interaction when the interaction is received from the web server 130 and, if an indication is received from the web server 130 or a third-party system that a chargeback was requested for the interaction, can later modify the information to indicate that the interaction was reversed or fraudulent.

In some examples, the anomaly detection subsystem 105 determines one or more trends of interactions with the web server 130 based on the interaction data and detects anomalies based on such trends. For instance, the anomaly detection subsystem 105 determines a fast trend (e.g., over a five-minute window) and a slow trend (e.g., over a one-week window) with respect to the interactions. Generally, a trend describes the set of interactions that occurred during a time window associated with that trend. A fast trend, a slow trend, or a combination thereof can be determined using an exponential window or a fixed time window. Using an exponential window, an example of the anomaly detection subsystem 105 applies one or more exponential smoothing algorithms or functions to interaction data within the applicable exponential window to determine a trend. For example, the anomaly detection subsystem 105 can apply exponential weights to interactions in the exponential window such that more recent interactions include larger weighting values than less recent interactions. Additionally or alternatively, the anomaly detection subsystem 105 can use a fixed window. The fixed window may include a set of interactions with a web server in a fixed time frame associated with the trend being computed (e.g., within the past five minutes for the fast trend). In this example, interaction data outside the fixed time frame may be discarded or otherwise zeroed. The anomaly detection subsystem 105 can use an exponential window, a fixed window, or a combination thereof to determine trends and thus to determine whether anomalies exist with respect to interactions in a time period.

As described in detail below, in some examples, the anomaly detection subsystem 105 computes both a slow trend (i.e., a long trend) and a fast trend (i.e., a short trend) and compares the two to determine a score. The score is indicative of anomalies within the time window corresponding to the fast trend, and thus, the score indicates a likelihood of fraudulent (i.e., malicious) activity. By using trends potentially with exponential smoothing, rather than using individual data points or disregarding old data, some examples can detect anomalies despite potentially noisy data. As a result, the anomaly detection subsystem 105 can detect anomalies with a higher degree of accuracy as compared to conventional systems.

To achieve the above, an example of the anomaly detection subsystem 105 bucketizes interaction data into time blocks (e.g., five-minute blocks), where each time block includes interaction data describing interactions occurring within a corresponding time period. Interactions may involve various types of network traffic originating from client devices 140 connected to the network 120. For each entity 110, such as a client device 140, an online user account 145, an IP address, an email address, or a phone number, associated with one or more interactions during a time period, the anomaly detection subsystem 105 can determine a number of times the entity 110 was involved in an interaction. In some examples, an interaction can be an HTTP request sent by a client device 140, a datagram or data packet sent by the client device 140, a login to a web server 130, the creation or modification of accounts associated with a web server, an online purchase, an account balance transfer, a media download, or various activities logged by the web server 130.

In some examples, the anomaly detection subsystem 105 can bucketize the information using two different time frames. For example, the anomaly detection subsystem 105 can bucketize the information using a fast time frame (e.g., five minutes), and a slow time frame (e.g., one hour, one week). In some examples, the anomaly detection subsystem 105 can normalize the bucketized information such that the bucketized information using the fast time frame and the bucketized information using the slow time frame can be compared. For example, the anomaly detection subsystem 105 divides the bucketized information for the fast time frame by an amount of time in the fast time frame and can divide the bucketized information for the slow time frame by the amount of time in the slow time frame. As mentioned above, the anomaly detection subsystem 105 may determine a slow trend and a fast trend. In such examples, the anomaly detection subsystem 105 uses the bucketized information using the slow time frame to determine the slow trend and uses the bucketized information using the fast time frame to determine the fast trend. In additional or alternative examples, the anomaly detection subsystem 105 bucketizes the interaction data using a single time frame (e.g., five minutes), which can be used for both the fast and slow trends, as described further below.

In some examples, the anomaly detection subsystem 105 computes a set of slow variables representing the slow trend, which can include slow mean $\mu_s$ and one or both of a slow variance $\sigma_s^2$ and a slow standard deviation $\sigma_s$, for each of one or more entities 110. The slow variables track the number of times an entity 110 was associated with an interaction during an interval of a predetermined length. Together, the slow variables represent the slow trend for that entity 110. In determining the slow trend, an example of the anomaly detection subsystem 105 uses an exponential smoothing function to reduce the impact of interactions on the slow mean $\mu_s$ as a function of time. Additionally, using exponential smoothing can allow for the determination of a new slow mean $\mu_s$ based on a previously determined slow mean $\mu_{s,n-1}$ and further based on a number of times the entity 110 was seen in a predetermined length of time $t_s$ (e.g., five minutes), also referred to as an interval. As a result, the entire record of past interactions need not be maintained because the previous slow mean represents the history of transactions.

An example of the anomaly detection subsystem 105 can compute the slow mean us as follows:

$$\mu_{s,n} = \alpha_s C_n + (1-\alpha_s)\mu_{s,n-1} \quad (1)$$

where $\mu_{s,n}$ is the slow mean for interval n, $\mu_{s,n-1}$ is the slow mean for interval n−1 (i.e., the interval immediately prior to interval n), $C_n$ is the number of times the specific entity 110 was associated with an interaction represented in the interaction data during interval n, and $\alpha_s$ is the slow smoothing factor. In some examples, the slow smoothing factor is between 0 and 1 and is an inverse of the length of the interval, such that the smoothing factor increases as the length of the interval decreases. The value of the slow smoothing factor effectively determines a length of the exponential time window for the slow trend by weighting the impact of older transactions.

Additionally, an example of the anomaly detection subsystem 105 can compute a slow variance $\sigma_s^2$ or a slow standard deviation $\sigma_s$ as follows:

$$\sigma_{s,n}^2 = (1-\alpha_s)[\sigma_{s,n-1}^2 + \alpha_s(C_n - \mu_{s,n-1})^2] \quad (2)$$

where $\sigma_{s,n}^2$ is the slow variance for interval n, $\sigma_{s,n}$ is the slow standard deviation for interval n, $\sigma_{s,n-1}^2$ is the slow variance for interval n−1, and $\sigma_{s,n-1}$ is the slow standard deviation for interval n−1.

In some examples, the anomaly detection subsystem 105 determines new slow variables (e.g., a new slow mean $\mu_s$ and a new slow variance $\sigma_s^2$ or slow standard deviation $\sigma_s$) for an interval after the conclusion of that interval (e.g., every five minutes for an interval of length five minutes). The anomaly detection subsystem 105 need not determine the slow variables for a particular entity 110 for an interval during which that entity 110 was not involved in an interaction according to the interaction data; rather, for a given interval, an example of the anomaly detection subsystem 105 determines the new slow variables for each entity 110 involved in at least interaction during that interval according to the interval data.

Thus, some examples compute the slow variables for a current interval (e.g., an interval that just concluded) based on the slow variables with respect to a prior interval, where that prior interval need not be the immediately prior interval, such as when an entity 110 was not involved in an interaction during the immediately prior interval. In some examples, the anomaly detection subsystem 105 determines a new slow mean $\mu_s$ and a new slow variance $\sigma_s^2$ as follows:

$$\mu_{s,n} = \alpha_s C_n + (1-\alpha_s)^{k+1} \mu_{s,n-(k+1)} \quad (3)$$

$$\sigma_{s,n}^2 = (1-\alpha_s)[(1-\alpha_s)^k[\sigma_{s,n-(k+1)}^2 + (1-(1-\alpha_s)^k)\mu_{s,n-(k+1)}^2] + \alpha_s(C_n - (1-\alpha_s)^k \mu_{s,n-(k+1)})^2] \quad (4)$$

where k is the number of time periods since the last time the slow mean $\mu_s$ was calculated. For example, n−(k+1) is the last time the entity 110 was associated with an interaction according to the interaction data.

In some examples, at the end of each interval, the anomaly detection subsystem 105 determines from the interaction data the count of interactions in which each entity 110 was involved during that interval. For each entity 110 involved in an interaction, the anomaly detection subsystem 105 retrieves a previous set of slow variables, such as a previous slow mean $\mu_{s,n-(k+1)}$ and a previous slow variance $\sigma_{s,n-(k+1)}^2$, and the interval for which the previous slow variables were calculated. Based on the previous slow variables and the timestamp, the anomaly detection subsystem 105 computes new slow variables, such as a new slow mean $\mu_{s,n}$ and a new slow variance $\sigma_{s,n}^2$. The anomaly detection subsystem 105 stores the new slow variables together with a new timestamp representing the current interval (e.g., the interval that just ended and for which new slow variables were computed).

In some examples, the anomaly detection subsystem 105 computes a set of fast variables representing the fast trend, which can include fast mean $\mu_f$ and one or both of a fast variance $\sigma_f^2$ and a fast standard deviation $\sigma_f$, for each of one or more entities 110. The fast variables track the number of times an entity 110 was associated with an interaction during an interval. Together, the fast variables represent the fast trend for that entity 110. In determining the fast trend, an example of the anomaly detection subsystem 105 uses an exponential smoothing function to reduce the impact of interactions on the fast mean $\mu_f$ as a function of time. Additionally, using exponential smoothing can allow for the determination of a new fast mean $\mu_f$ based on a previously determined fast mean $\mu_{f,n-1}$ and further based on a number of times the entity 110 was seen in a predetermined length of time $t_s$ (e.g., five minutes), also referred to as an interval. As a result, the entire record of past interactions need not be maintained because the previous fast mean represents the history of transactions. In some examples, the length of the intervals is the same for determining both the fast trend and the slow trend; however, the exponential smoothing may be applied differently such that the fast trend gives greater weight to more recent interaction data.

An example of the anomaly detection subsystem 105 can compute the fast mean $\mu_f$ as follows:

$$\mu_{f,n} = \alpha_f C_n + (1-\alpha_f)\mu_{f,n-1} \quad (5)$$

where $\mu_{f,n}$ is the fast mean for interval n, $\mu_{f,n-1}$ is the fast mean for interval n−1 (i.e., the interval immediately prior to interval n), $C_n$ is the number of times the entity 110 was associated with an interaction during interval n, and $\alpha_f$ is the fast smoothing factor. In some examples, the fast smoothing factor is between 0 and 1 and is an inverse of the length of the interval for the fast trend, such that the smoothing factor increases as the length of the interval decreases.

The value of the fast smoothing factor effectively determines a length of the exponential time window for the fast trend by weighting the impact of older transactions. In some examples, the fast smoothing factor $\alpha_f$ is larger than the slow smoothing factor $\alpha_s$, and this difference contributes to the variation between the fast mean and the slow mean. Accordingly, the fast mean $\mu_f$ can reduce the influence of older time buckets at a faster rate than that of the slow mean $\mu_s$ and thus provides greater weight to more recent interactions.

In some examples, the anomaly detection subsystem 105 computes a fast variance $\sigma_f^2$ or fast standard deviation $\sigma_f$ as follows:

$$\sigma_{f,n}^2 = (1-\alpha_f)[\sigma_{f,n-1}^2 + \alpha_f(C_n - \mu_{f,n-1})^2] \quad (6)$$

where $\sigma_{f,n}^2$ is the fast variance for interval n, $\sigma_{f,n}$ is the fast standard deviation for interval n, $\sigma_{f,n-1}^2$ is the fast variance for interval n−1, and $\sigma_{f,n-1}$ is the fast standard deviation for interval n−1.

In some examples, the anomaly detection subsystem 105 determines new fast variables (e.g., a new fast mean $\mu_f$ and a new fast variance $\sigma_f^2$ or fast standard deviation $\sigma_f$) for an interval after the conclusion of that interval (e.g., every five minutes for an interval of length five minutes). The anomaly detection subsystem 105 need not determine the fast variables for a particular entity 110 for an interval during which that entity 110 was not involved in an interaction according to the interaction data; rather, for a given interval, an example of the anomaly detection subsystem 105 determines the new fast variables for each entity 110 involved in at least one interaction during that interval according to the interval data.

Thus, some examples compute the fast variables for a current interval (e.g., an interval that just concluded) based on the fast variables with respect to a prior interval, where that prior interval need not be the immediately prior interval, such as when an entity 110 was not involved in an interaction during the immediately prior interval. In some examples, the anomaly detection subsystem 105 determines a new fast mean $\mu_f$ and a new fast variance of as follows:

$$\mu_{f,n} = \alpha_f C_n + (1-\alpha_f)^{k+1}\mu_{f,n-(k+1)}$$

$$\sigma_{f,n}^2 = (1-\alpha_f)[(1-\alpha_f)^k[\sigma_{f,n-(k+1)}^2 + (1-(1-\alpha_f)^k)\mu_{f,n-(k+1)}^2] + \alpha_f(C_n - (1-\alpha_f)^k \mu_{f,n-(k+1)})^2] \quad (7)$$

where k is the number of intervals since the last time the fast mean $\mu_f$ was calculated. For example, n−(k+1) may be the last time the entity 110 was associated with an interaction according to the interaction data.

In some examples, at the end of each interval, the anomaly detection subsystem 105 determines from the interaction data the count of interactions in which each entity 110 was involved during that interval. For each entity 110 involved in an interaction, the anomaly detection subsystem 105 retrieves a previous set of fast variables, such as a previous fast mean $\mu_{f,n-(k+1)}$ and a previous fast variance $\sigma_{f,n-(k+1)}^2$ and a timestamp of the interval associated with the previous fast variables. Based on the previous fast variables and the timestamp, the anomaly detection subsystem 105 calculates new fast variables. The anomaly detection subsystem 105 can store the new fast variables together with a new timestamp.

In some examples, the fast smoothing factor $\alpha_f$ can be set to be equal to one. In this example, the anomaly detection subsystem 105 can keep track of the count corresponding to network traffic in the current time frame. In this example, the fast mean $\mu_f$ can be equal to the number of times the entity 110 was seen in interactions during interval n.

$$\mu_{f,n}=\alpha_f C_n+(1-\alpha_f)\mu_{f,n-1}=C_n+(1-1)\mu_{f,n-1}=C_n \quad (9)$$

In some examples, instead of using an exponential time window, the anomaly detection subsystem 105 can use a fixed time window for either or both of the fast mean and the slow mean. In this case, an example of the anomaly detection subsystem 105 calculates a first moving average and a first moving variance, or first moving standard deviation using a first fixed window used for the slow trend, and the anomaly detection subsystem 105 computes a second moving average using a second fixed time window for the fast trend. For example, the first fixed time window for the slow trend can capture data that is within a week or a month, and the second fixed time window for the fast trend can capture data that is within an hour or a day. In some examples, the anomaly detection subsystem 105 and the anomaly detection subsystem 105 determines an interquartile range or other statistical property instead of, or in addition to, a standard deviation or a variance. The interquartile range can be determined using fixed time windows.

Based on a comparison of the fast trend to the slow trend, the anomaly detection subsystem 105 can determine a score $\theta_n$ indicative of a level of anomalous activity and, thus, indicative of a risk that a behavior being displayed by an entity 110 during interval n includes fraudulent activity. In some examples, to perform such comparison, the anomaly detection subsystem 105 uses the slow mean $\mu_{s,n}$ to zero out the fast mean $\mu_{f,n}$, thus enabling analysis of the fast mean in view of the slow mean. The anomaly detection subsystem 105 divides the zeroed fast mean $(\mu_{f,n}-\mu_{s,n})$ by the slow standard deviation $\sigma_{s,n}$ to determine a score for the interactions associated with the entity 110 during interval n. In some examples, if the slow standard deviation $\sigma_{s,n}$ is smaller than a minimum standard deviation value $\sigma_{min}$, the minimum standard deviation value $\sigma_{min}$ can be used.

In some examples, the anomaly detection subsystem 105 computes the score $\theta_n$ for an entity 110, representing a comparison between the fast trend and the slow trend, as follows:

$$\theta_n \equiv \left(1 - e^{-\frac{\mu_{f,n}}{b}}\right)\frac{\mu_{f,n} - \mu_{s,n-1}}{\max(\sigma_{min}, \sigma_{s,n-1})} \quad (10)$$

where $\theta_n$ is the score for interval n, $\mu_{f,n}$ is the fast mean for interval n, $\mu_{s,n}$ is the slow mean for interval n, $\sigma_{s,n}$ is the slow standard deviation for interval n, $\sigma_{min}$ is the minimum standard deviation, and b is a volume damping factor. The volume damping factor contributes to how sensitive the scores are to recent fluctuations in the interaction data. In some examples, the volume damping factor is greater than 0 and no higher than 1.

In some examples, if the fast smoothing factor $\alpha_f=1$, the anomaly detection subsystem 105 computes the score $\theta_n$ for an entity 110 as follows:

$$\theta_n \equiv \left(1 - e^{-\frac{C_n}{b}}\right)\frac{C_n - \mu_{s,n-1}}{\max(\sigma_{min}, \sigma_{s,n-1})} \quad (11)$$

where $\theta_n$ is the score for interval n, $C_n$ is the number of times the entity 110 was associated with an interaction according to the interaction data during interval n, $\mu_{s,n}$ is the slow mean for interval n, $\sigma_{s,n}$ is the slow standard deviation for interval n, $\sigma_{min}$ is the minimum standard deviation, and b is a volume damping factor.

In some examples, for each interval, the anomaly detection subsystem 105 computes a score for each entity 110 involved in at least one interaction during the interval and compares the score to a threshold to determine whether the interactions associated with the entity 110 are suspicious or otherwise anomalous. For example, if the score $\theta_n$ for interval n meets (e.g., equals or exceeds) a threshold value, the anomaly detection subsystem 105 flags the interactions of the entity 110 as anomalous.

In some examples, the access control subsystem 107 implements an access control or other remediation activity responsive to interactions of an entity 110 being deemed anomalous by the anomaly detection subsystem 105. The access control subsystem 107 can perform various remediation activities, which can vary across entities 110 or based on the score associated with the entity 110.

In one example, the access control subsystem 107 either directly or indirectly blocks the entity 110 from performing further interactions, at least temporarily. To this end, for instance, the access control subsystem 107 notifies the web server 130 of the anomalous activity of the entity 110, such that the web server 130 can deny further interactions with the entity 110. Additionally or alternatively, in an example in which the web server 130 seeks approval from the network security system 100 before approving each interaction, the access control subsystem 107 can deny such approval, such that the web server 130 rejects further interactions from the entity 110.

In another example, the access control subsystem 107 activates an additional authentication requirement before allowing further interactions involving the entity 110. To this end, for instance, the access control subsystem 107 notifies the web server 130 of the anomalous activity of the entity 110, such that the web server 130 can require an additional authentication step for the entity 110. Additionally or alternatively, in an example in which the web server 130 seeks approval from the network security system 100 before approving each interaction, the access control subsystem 107 can notify the web server 130 of any additional requirements, such that the web server 130 requests that the entity 110 comply with the additional requirements before an interaction can be approved. Various implementations of remediation are possible and are within the scope of this disclosure.

Examples of Operations

Figure 3:
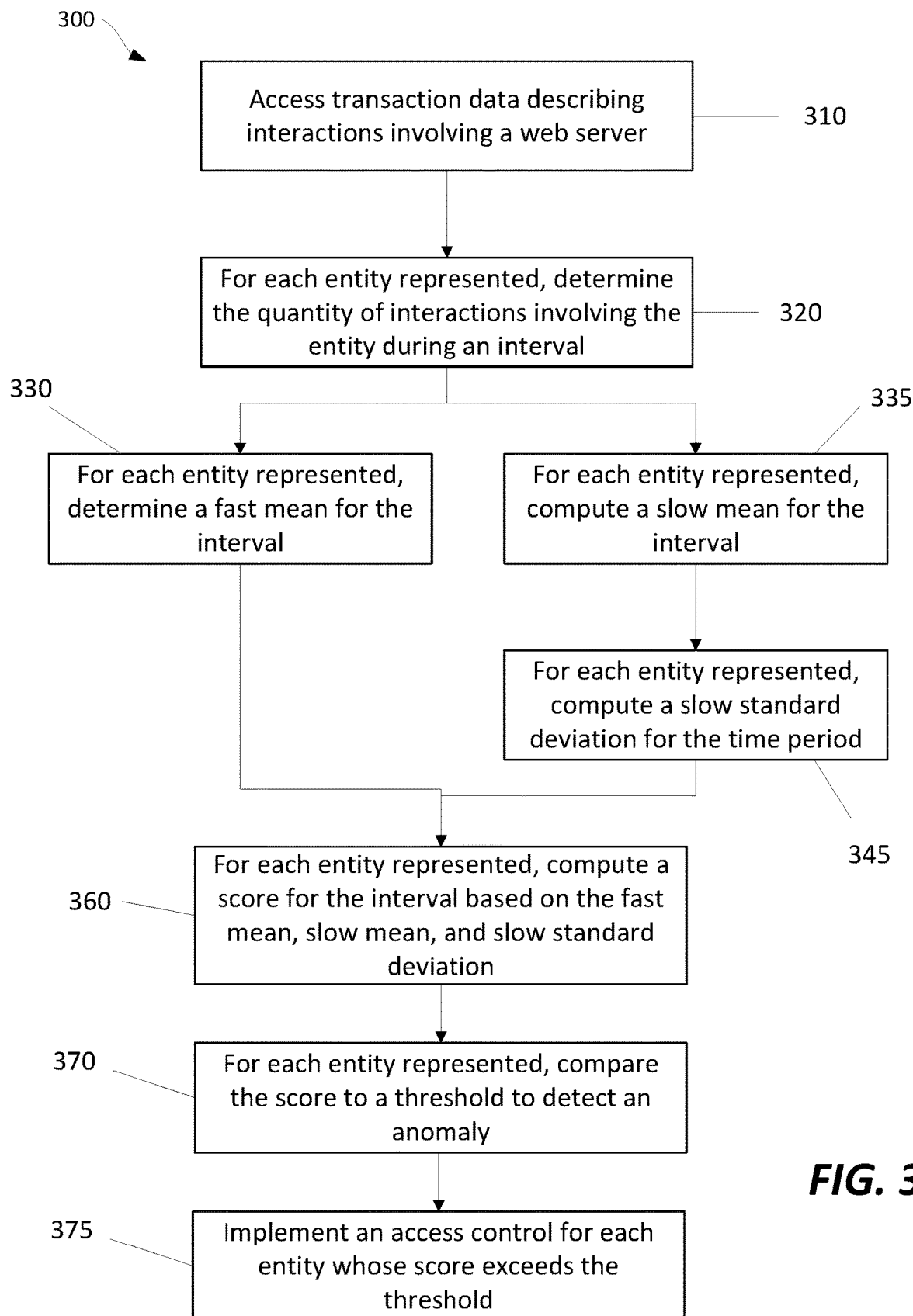
FIG. 3 is a flow diagram of a process for detecting anomalies in network traffic associated with the web server, according to some examples of this disclosure.

FIG. 3 is a flow diagram of a process 300 for detecting anomalies in network traffic, or other time-series data, according to some examples of this disclosure. In some examples, the network security system 100 performs this process 300 or similar at the end of each interval. Prior to performance of this process 300 being executed for the first time, however, the network security system 100 may allow a warm-up period to pass, such that values determined for the warm-up period are used as initial data representing previous intervals for computing the various fast and slow variables.

The process 300 depicted in FIG. 3 may be implemented in software (e.g., code, instructions, program) executed by one or more processing units of a computer system, implemented in hardware, or implemented in a combination of software and hardware. The process 300 presented in FIG. 3 and described below is intended to be illustrative and non-limiting. Although FIG. 3 depicts various processing operations occurring in a particular sequence or order, this is not intended to be limiting. In certain alternative examples, the processing may be performed in a different order or some operations may also be performed in parallel.

As shown in FIG. 3, at block 310, the network security system 100 accesses interaction data describing new interactions, which are interactions that occurred during a completed interval n. The interactions can include financial transactions, login attempts, account creations, or other suitable online interactions that can involve one or more entities 110. The network security system 100 can store the interaction data in the interaction datastore 102 or in another suitable location.

At block 320, for each entity 110 involved in at least interaction during the interval, the network security system 100 determines, from the interaction data, a number of interactions $C_n$ involving the entity 110 during the interval n. For instance, the network security system 100 determines a count of interactions represented in the interaction data for each entity 110.

At block 330, for each entity 110 involved in an interaction during the interval, the network security system 100 determines a fast mean $\mu_{f,n}$ for the interval n. The network security system 100 can use the anomaly detection subsystem 105 to determine the fast mean $\mu_{f,n}$ for the interval n based on the determined number of interactions $C_n$ that originated from the entity 110 during the interval n and a stored slow mean $\mu_{f,n-(k+1)}$ determined at interval n−(k+1). In some examples, if the fast smoothing factor $\alpha_f=1$, the fast mean $\mu_{f,n}$ is equal to the number of interactions $C_n$ involving the entity 110 during the interval n.

At block 335, for each entity 110 involved in an interaction during the interval, the network security system 100 determines a slow mean $\mu_{s,n}$ for the interval n. The network security system 100 can use the anomaly detection subsystem 105 to determine the slow mean $\mu_{s,n}$ for the interval n based on the determined number of interactions $C_n$ that originated from the entity 110 during the interval n and a stored slow mean $\mu_{s,n-(k+1)}$ determined at interval n−(k+1).

At block 345, for each entity 110 involved in an interaction during the interval, the network security system 100 determines a slow standard deviation $\sigma_{s,n}$ for the interval n. The network security system 100 can use the anomaly detection subsystem 105 to determine the slow standard deviation $\sigma_{s,n}$ for the interval n based on the determined number of interactions $C_n$ that originated from the entity 110 during the interval n, the stored slow mean $\mu_{s,n-(k+1)}$ determined at interval n−(k+1), and the stored slow standard deviation $\sigma_{s,n-(k+1)}$ determined at interval n−(k+1).

At block 360, for each entity 110 involved in an interaction during the interval, the network security system determines a score associated with the entity 110 for the interval n. Based on the determined slow mean $\mu_{s,n}$ for the interval n, the slow standard deviation $\sigma_{s,n}$ for interval n, and the fast mean $\mu_{f,n}$ for the interval n, the network security system 100 can use the anomaly detection subsystem 105 to determine the score $\theta_n$ for the interval n. The score $\theta_n$ can indicate the likelihood that interactions involving the entity 110 are fraudulent.

At block 370, for each entity 110 involved in an interaction during the interval, the network security system 100 compares the assigned score $\theta_n$ to a threshold. The threshold can be a value above which interactions are considered fraudulent or otherwise anomalous. For example, the threshold is defined by the network security system 100 or is user-defined. In another example, the threshold may be dynamic, such as to automatically adjust to ensure that at least a certain percentage of entities 110 during an interval are deemed to be associated with anomalous activity, so as to reduce false negatives in the case where a certain percentage of fraud is expected. In some examples, the network security system 100 uses the anomaly detection subsystem 105 to compare the score $\theta_n$ with the threshold to determine whether to identify the interactions during interval n are deemed anomalous or otherwise suspicious.

At block 375, the network security system 100 implements an access control for each entity 110 having a score that meets the threshold but, in some examples, not for entities whose scores do not meet the threshold. The access control can take various forms and may vary based on the entity 110 or based on the specific score. In some examples, the access control subsystem 107 of the network security system 100 directly or indirectly provides access controls for each entity 110 assigned a score that meets the threshold. To this end, for instance, the access control subsystem 107 notifies the web server 130 of each entity 110 having a respective score that meets the threshold, and in turn, the web server 130 increases security for each such entity 110 (i.e., by blocking interactions or requiring further authentication). Additionally or alternatively, the access control subsystem 107 directly blocks interactions with the entity 110 by denying further interactions, at least temporarily, such as in a case in which the network security system 100 has to approve each individual interaction.

Example of a Computing System for Detecting Anomalies

Figure 4:
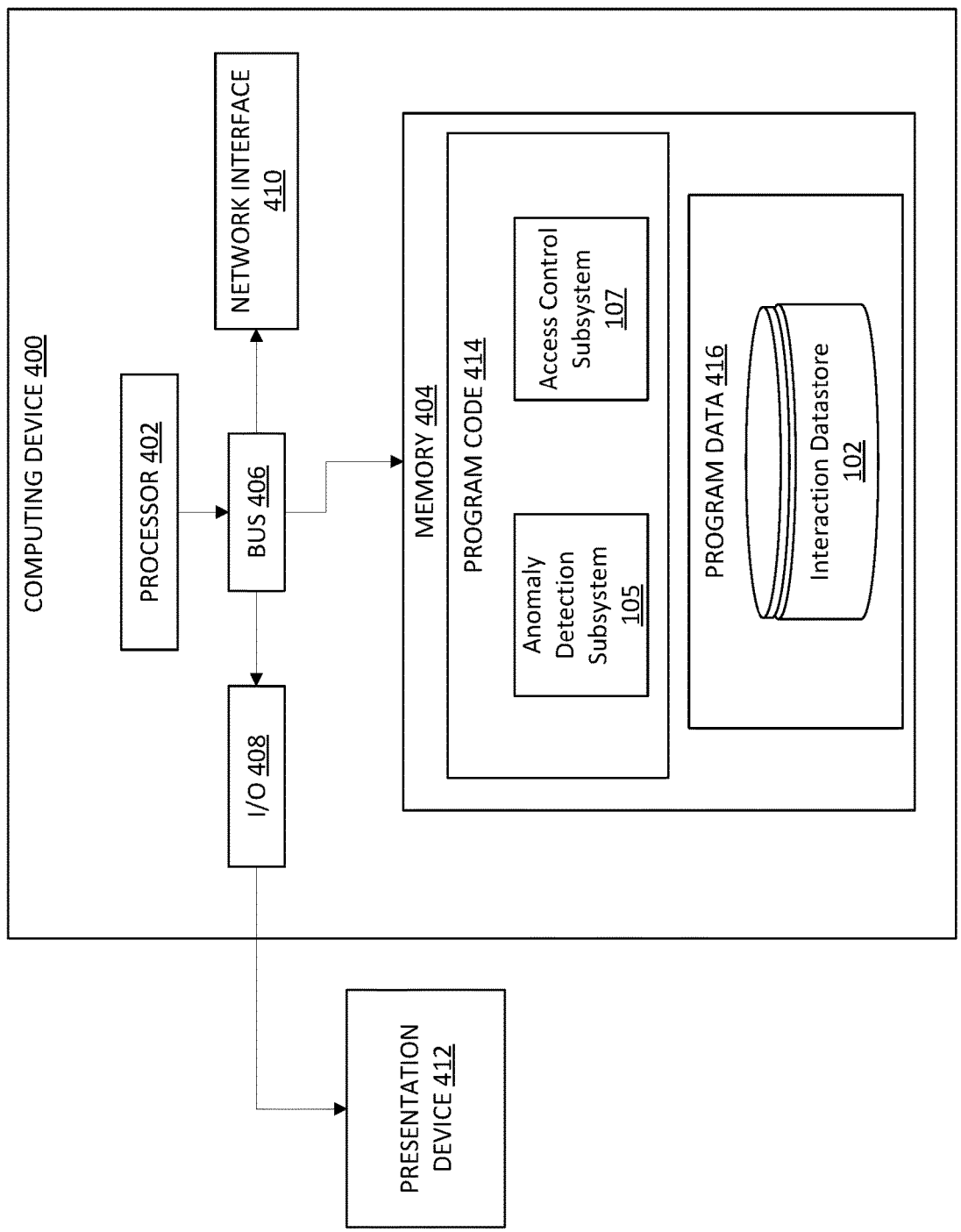
FIG. 4 is a diagram of a computing device suitable for implementing aspects of the techniques and technologies described herein, according to some examples of this disclosure.

FIG. 4 is a diagram of a computing device 400 suitable for implementing aspects of the techniques and technologies described herein, according to some examples of this disclosure. Any suitable computing system or group of computing systems can be used to perform the operations for the machine-learning operations described herein. For example, FIG. 4 is a block diagram depicting an example of a computing device 400, which can be used to implement the network security system 100 or other suitable components of the computing environment 101, and which may be in communication with a web server 130 for improving the efficiency of the web server's operations through improved anomaly detection. The computing device 400 can include various devices for communicating with other devices in the computing environment 101, as described with respect to FIG. 1. The computing device 400 can include various devices for performing one or more operations described above with reference to FIGS. 1-3.

The computing device 400 can include a processor 402 that is communicatively coupled to a memory 404. The processor 402 executes computer-executable program code stored in the memory 404, accesses information stored in the memory 404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 402 include a microprocessor, an application-specific integrated circuit (ASIC), a field-programmable gate array (FPGA), or any other suitable processing device. The processor 402 can include any number of processing devices, including one. The processor 402 can include or communicate with a memory 404. The memory 404 can store program code that, when executed by the processor 402, causes the processor to perform the operations described in this disclosure.

The memory 404 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 400 may also include a number of external or internal devices such as input or output devices. For example, the computing device 400 is shown with an input/output interface 408 that can receive input from input devices or provide output to output devices. A bus 406 can also be included in the computing device 400. The bus 406 can communicatively couple one or more components of the computing device 400.

The computing device 400 can execute program code 414 that includes one or more of the anomaly detection subsystem 105, the access control subsystem 107, or other suitable subsystem of the network security system 100. The program code 414 for the network security system 100 may reside in a suitable computer-readable medium, which may be non-transitory, and may be executed on any suitable processing device. For example, as depicted in FIG. 4, the program code 414 for the network security system 100 can reside in the memory 404 at the computing device 400 along with the program data 416 associated with the program code 414, such as data in the interaction datastore 102. Executing the network security system 100 can configure the processor 402 to perform the operations described herein.

In some aspects, the computing device 400 can include one or more output devices. One example of an output device is the network interface device 410 depicted in FIG. 4. A network interface device 410 can include any device or group of devices suitable for establishing a wired or wireless data connection to one or more data networks described herein. Non-limiting examples of the network interface device 410 include an Ethernet network adapter, a modem, etc.

Another example of an output device is the presentation device 412 depicted in FIG. 4. A presentation device 412 can include any device or group of devices suitable for providing visual, auditory, or other suitable sensory output. Non-limiting examples of the presentation device 412 include a touchscreen, a monitor, a speaker, a separate mobile computing device, etc. In some aspects, the presentation device 412 can include a remote client-computing device that communicates with the computing device 400 using one or more data networks described herein. In other aspects, the presentation device 412 can be omitted.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising:
accessing transaction data describing network traffic associated with a web server during an interval;
determining a short-term trend for an online entity, based on a count of new transactions involving the online entity during the interval according to the transaction data;
applying exponential smoothing to a history of transactions of the online entity to compute a long-term trend for the online entity, wherein applying the exponential smoothing comprising:
computing a long-term moving average of a count of transactions involving the online entity using a long-term exponential time window, and
computing a long-term moving standard deviation of the count of transactions involving the online entity using the long-term exponential time window, wherein the long-term moving average is an exponentially smoothed average, and wherein the long-term moving standard deviation is an exponentially smoothed standard deviation;
detecting that an anomaly exists with respect to the online entity in the network traffic associated with the web server, based on a comparison between the short-term trend and the long-term trend for the online entity; and
implementing an access control between the online entity and the web server responsive to detecting the anomaly.

2. The method of claim 1, wherein determining the short-term trend for the online entity comprises computing a short-term moving average for the count of transactions involving the online entity using a short-term exponential time window.

3. The method of claim 2, wherein:
the short-term exponential time window is determined by a short-term smoothing factor for weighting transactions occurring prior to the interval;
the long-term exponential time window is determined by a long-term smoothing factor for weighting transactions prior to the interval; and
the long-term smoothing factor differs from the short-term smoothing factor.

4. The method of claim 2, wherein detecting that the anomaly exists with respect to the online entity in the network traffic based on the comparison between the short-term trend and the long-term trend for the online entity comprises computing a difference between the short-term moving average and the long-term moving average.

5. The method of claim 4, wherein detecting that the anomaly exists with respect to the online entity in the network traffic based on the comparison between the short-term trend and the long-term trend for the online entity further comprises:
computing a score for the online entity based on dividing by long-term moving standard deviation the difference between the short-term moving average and the long-term moving average; and
comparing the score for the online entity to a threshold.

6. The method of claim 1, wherein determining the short-term trend for the online entity comprises assigning to the short-term trend a value equal to the count of new transactions involving the online entity in the transaction data.

7. The method of claim 6, wherein detecting that the anomaly exists with respect to the online entity in the network traffic based on the comparison between the short-term trend and the long-term trend for the online entity comprises:
computing a difference between a short-term moving average and the long-term moving average;
computing a score for the online entity based on dividing by long-term moving standard deviation the difference between the short-term moving average and the long-term moving average; and
comparing the score for the online entity to a threshold.

8. A system comprising:
a processor; and
a non-transitory computer-readable medium comprising instructions that are executable by the processor to cause the processor to perform operations comprising:
accessing transaction data describing network traffic associated with a web server during an interval;
determining a short-term trend for an online entity, based on a count of new transactions involving the online entity during the interval according to the transaction data;
applying exponential smoothing to a history of transactions of the online entity to compute a long-term trend for the online entity, wherein applying the exponential smoothing comprises:
computing a long-term moving average of a count of transactions involving the online entity using a long-term exponential time window, and
computing a long-term moving standard deviation of the count of transactions involving the online entity using the long-term exponential time window, wherein the long-term moving average is an exponentially smoothed average, and wherein the long-term moving standard deviation is an exponentially smoothed standard deviation;
detecting that an anomaly exists with respect to the online entity in the network traffic associated with the web server, based on a comparison between the short-term trend and the long-term trend for the online entity; and
remediating the anomaly in the network traffic associated with the web server.

9. The system of claim 8, wherein determining the short-term trend for the online entity comprises computing a short-term moving average for the count of transactions involving the online entity using a short-term exponential time window.

10. The system of claim 9, wherein:
the short-term exponential time window is determined by a short-term smoothing factor for weighting transactions occurring prior to the interval;
the long-term exponential time window is determined by a long-term smoothing factor for weighting transactions prior to the interval; and
the long-term smoothing factor differs from the short-term smoothing factor.

11. The system of claim 9, wherein detecting that the anomaly exists with respect to the online entity in the network traffic based on the comparison between the short-term trend and the long-term trend for the online entity comprises computing a difference between the short-term moving average and the long-term moving average.

12. The system of claim 11, wherein detecting that the anomaly exists with respect to the online entity in the network traffic based on the comparison between the short-term trend and the long-term trend for the online entity further comprises:
computing a score for the online entity based on dividing by long-term moving standard deviation the difference between the short-term moving average and the long-term moving average; and
comparing the score for the online entity to a threshold.

13. A non-transitory computer-readable storage medium having program code that is executable by a processor device to cause the processing device to perform operations comprising:
accessing transaction data describing network traffic associated with a web server during an interval;
determining a short-term trend for an online entity, based on a count of new transactions involving the online entity during the interval according to the transaction data;
applying exponential smoothing to a history of transactions of the online entity to compute a long-term trend for the online entity;
detecting that an anomaly exists with respect to the online entity in the network traffic associated with the web server, based on a comparison between the short-term trend and the long-term trend for the online entity, wherein detecting the anomaly comprises:
computing a score for the online entity based on the comparison between the short-term trend and the long-term trend, and
comparing the score for the online entity to a threshold; and
implementing an access control between the online entity and the web server responsive to detecting the anomaly.

14. The non-transitory computer-readable storage medium of claim 13, wherein:
applying exponential smoothing to the history of transactions of the online entity to compute the long-term trend for the online entity comprises computing a long-term moving average of a count of transactions involving the online entity using a long-term exponential time window; and
determining the short-term trend for the online entity comprises computing a short-term moving average for the count of transactions involving the online entity using a short-term exponential time window.

15. The non-transitory computer-readable storage medium of claim 14, wherein:
the short-term exponential time window is determined by a short-term smoothing factor for weighting transactions occurring prior to the interval;
the long-term exponential time window is determined by a long-term smoothing factor for weighting transactions prior to the interval; and
the long-term smoothing factor differs from the short-term smoothing factor.

16. The non-transitory computer-readable storage medium of claim 13, wherein determining the short-term trend for the online entity comprises assigning to the short-term trend a value equal to the count of new transactions involving the online entity in the transaction data.

17. The non-transitory computer-readable storage medium of claim 16, wherein detecting that the anomaly exists with respect to the online entity in the network traffic based on the comparison between the short-term trend and the long-term trend for the online entity comprises:

computing a difference between a short-term moving average and a long-term moving average;
computing a score for the online entity based on dividing by long-term moving standard deviation the difference between the short-term moving average and the long-term moving average; and
comparing the score for the online entity to a threshold.

* * * * *